(12) United States Patent
Peters

(10) Patent No.: US 6,516,421 B1
(45) Date of Patent: Feb. 4, 2003

(54) METHOD AND MEANS FOR ADJUSTING THE TIMING OF USER-ACTIVITY-DEPENDENT CHANGES OF OPERATIONAL STATE OF AN APPARATUS

(75) Inventor: Matthew Francis Peters, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,233

(22) Filed: Feb. 17, 2000

(30) Foreign Application Priority Data

Oct. 27, 1999 (GB) ............................................. 9925289

(51) Int. Cl.[7] ............................................... G06F 9/44
(52) U.S. Cl. ....................................... 713/502; 713/320
(58) Field of Search ................................. 713/300, 320, 713/323, 502

(56) References Cited

U.S. PATENT DOCUMENTS

| 5,905,901 A | * | 5/1999 | Klein | 713/324 |
| 5,913,067 A | * | 6/1999 | Klein | 713/300 |
| 6,374,145 B1 | * | 4/2002 | Lignoul | 700/17 |
| 6,384,852 B1 | * | 5/2002 | Ye et al. | 345/867 |
| 2002/0095222 A1 | * | 7/2002 | Lignoul | 700/13 |

* cited by examiner

Primary Examiner—Thomas M. Heckler
(74) Attorney, Agent, or Firm—David A. Mims, Jr.

(57) ABSTRACT

Provided is a method and components of an apparatus for implementing a method for assisting with adjustment of the timing of user-inactivity-dependent changes of operational state of an apparatus, by identifying user interactions following a change of operational state, determining when the user's interactions or lack of interaction following the change of state suggest that a change to an inactivity time period is desirable, and either automatically changing the inactivity time period or prompting the user to change the time period.

19 Claims, 3 Drawing Sheets

METHOD AND MEANS FOR ADJUSTING THE TIMING OF USER-ACTIVITY-DEPENDENT CHANGES OF OPERATIONAL STATE OF AN APPARATUS

FIELD OF INVENTION

The present invention relates to assisting a user of an apparatus with adjustment of the timing of user-activity-dependent operational state changes of the apparatus.

BACKGROUND

It is known for operating systems running on a data processing system to trigger display of a screen saver or to blank the screen of a display device after a preset period of inactivity by the system user. "Inactivity" in this context means that the user has not interacted with a user input device for which user activity is being measured. The operating system receives signals from an input controller connected to the input devices whenever the user interacts with an input device (for example, whenever the user moves a mouse or presses a keyboard key), each user interaction resetting a timer. If no such signals are received within the preset time period then the operating system displays a preselected screen saver animation sequence or image or blanks the screen.

Screen savers are displayed for a number of reasons, including to protect confidential information when the user is absent, to present a particular message, rolling demonstration or advertisement if the monitor is located where it can be seen by an audience, or merely to please the user. Originally, screen saver animation sequences and screen blanking were used to avoid the "screen burn" which could result from displaying the same image for a long time, but this is no longer a problem on most modern display devices.

In many operating systems, the user can specify the required period of inactivity before the screen saver is displayed, and also specify a period of inactivity before the display monitor switches to a low power standby mode and/or switches off to save energy. Each transition including displaying the screen saver, changing to the low power mode, and automatically switching off a display monitor can be described as a change of operational state of the apparatus.

Screen savers may be password protected (i.e. once displayed, the user has to enter a valid password to remove the screen saver) or the screen saver may disappear as soon as the user interacts with an input device, and the user may be able to specify whether or not password protection is required.

A problem which arises with screen saver display and other changes of operational state of a data processing apparatus is that a lack of user interaction with input devices is not a reliable indicator that the user is absent. The user may be reading text on the display screen at the time the operating system determines that an inactivity time period has expired, and then the screen saver overlays what the user is trying to read or the monitor switches off. Although the user typically only has to move the mouse or press any keyboard key for the screen saver to be removed, nevertheless the appearance of the screen saver while the user is trying to read can be annoying. If the screen saver is password protected or if the monitor switches off, then the action required of the user and the time taken to return to the text they were reading can be sufficient to destroy their train of thought. This can be very irritating and reduces the user's productivity.

Users typically do not want to have to open a new window to reset the inactivity time periods while they are involved in another task, and users often forget what sequence of steps is required for operations that they seldom perform such as changing these settings. For these reasons, there may be repeated unwanted appearances of the screen saver while the user is trying to read a large document, and then when the user has completed that task they may forget to reset the inactivity time periods so that the frustration is repeated later.

One solution to this problem is provided by Microsoft Corporation's Windows 98 operating system. If a user moves the mouse pointer to a specific corner of the screen, the operating system interprets this as a request not to display the screen saver. This can be useful for reading long documents, but it has the inconvenience of requiring proactive mouse pointer positioning by the user. Also, users typically want the mouse pointer to remain available for interaction with items within the graphical user interface. Furthermore, many data processing and communications devices are not capable of running Windows 98 or include a mouse.

The Windows 98 operating system also allows users to specify a time period before password protection is applied which is different from the time period before the screen saver is displayed. This helps to minimize the problem of unwanted display of the screen saver, since if the user sets a longer period before password protection is applied they can typically cause the screen saver to disappear by merely moving the mouse. Nevertheless, the appearance of the screen saver can be annoying and the user still has to open the appropriate window to change screen saver settings. As mentioned, the time at which the screen saver appears may be an inconvenient time to have to open additional windows to change settings.

The problems of irritation and reduced user productivity caused by automatic activation of operational state changes of an apparatus at times which are inconvenient to the user are relevant to many different types of operational state change in many different types of apparatus.

SUMMARY OF INVENTION

The present invention provides a method and means for assisting with adjustment of the timing of user-inactivity-dependent changes of operational state of an apparatus, by identifying user interactions following a change of operational state, determining when the user's interactions or lack of interaction following the change of state suggest that a change to an inactivity time period is desirable, and either automatically changing the inactivity time period or prompting the user to change the time period.

Various different policies may be applied for determining when the user's interactions following a state change suggest a desire for an increase to an inactivity time period. In a first embodiment, if the user interacts with an input device within 5 seconds after a user-inactivity-dependent change of operational state such as display of the screen saver, then this is interpreted as an indication that the user did not want the state change to occur at that time. If the user interacts with an input device within this 5 second period following three consecutive appearances of the screen saver (or other state change), then this activates an automatic increase of the inactivity period before the screen saver is displayed. For example, the inactivity time period may be changed from 5 minutes to 6 minutes.

The criteria for determining when an increase to the inactivity period seems to be required could be the same or different for different types of operational state change of an apparatus. For example, when a monitor switches to a low power mode following a period (e.g. 20 minutes) of user inactivity, a check may be performed of whether the user interacts with an input device connected to the apparatus within a 1 minute period following this mode switch. If the user consistently interacts with the apparatus during this 1 minute period following switch to the low power mode, then that is interpreted as an indication that the switch to low power mode after 20 minutes inactivity was not required. The inactivity period before switching to low power mode may then be changed to 30 minutes.

In another example, a user may be automatically logged off from a remote server computer system or process if the user does not interact with the remote system or process via interaction with a device which is local to the user. Hence, while in some embodiments of the invention the interactions which are compared with a timer may be all of the user's interactions with the local device (if the state transition is intended to be activated in response to a determination of lack of use of the local apparatus), in other embodiments the relevant interactions are only specific types of user interaction if the state transition is relevant to a remote resource.

Additionally, if a state transition is relevant to only a specific component of the local apparatus then it may be that only the interactions which are relevant to that component are monitored in comparison with the inactivity timer.

A number of different responses are possible following determination that the user appears to want a change to the inactivity time period, and these may differ significantly for different state transitions and different apparatus. For example, the relevant inactivity time period may be automatically increased or the user may be prompted to increase the period. Such prompting may be via a pop up window which includes input fields or scrollable lists of selectable values for screen saver settings and/or settings for when to switch to low power mode and/or when to switch off the display device or other components of the apparatus. Note that the mode switch to a low power standby mode and switching off may be applied separately to different power-consuming components of an apparatus, and hence the measurement of user interactions following such state changes may be implemented separately for each state change.

The user may be prompted, for example by a pop up window, at the time it is determined that a change to an inactivity period seems to be desired, or only at some later time when the user's task is deemed to be complete such as when the user indicates completion by selecting log off or shut down.

It is also possible to determine that an inactivity period before a change of operational state is longer than an optimum period of time. For example, some users may specify very long inactivity periods before a state change occurs to minimize their personal inconvenience, but this may conflict with the energy saving aims of the a organization which owns the apparatus they are using. Users setting long inactivity periods may also impact security or reduce the amount of time for which a desired company logo or rolling demonstration is displayed. For these reasons, the present invention may also be used to automatically reduce an inactivity period towards an optimum inactivity period if it is determined that the user consistently does not interact with the apparatus in a preset time period following a state change.

To avoid increasing user annoyance when implementing the above automatic reduction feature, the policy which is implemented may be to only reduce the inactivity period if the user consistently does not interact with the system in the preset short period following a state change over an extended period (for example, over an extended period such as 4 hours or 1 week).

The present invention may be implemented within an operating system of a data processing apparatus, or in any component of an apparatus which is capable of monitoring user interactions and comparing with a system clock to enforce a user-inactivity-dependent state transition.

BRIEF DESCRIPTION OF DRAWINGS

Embodiments of the invention will now be described in more detail, by way of example, with reference to the accompanying drawings in which.

DETAILED DESCRIPTION OF PREFERRED EMBODIMENTS

The present invention provides assistance to a user of any apparatus for which operational state changes occur in response to measured periods of user inactivity. Such an apparatus may be a data processing apparatus such as a desktop or laptop personal computer, a PDA, a telephone, an embedded data processing component within some other apparatus such as in a vehicle, or an interactive television. The change of state may apply to the apparatus or to any component thereof, or any process or program running on the apparatus. The operational state change may include initiation of display of a screen saver, applying password protection to a displayed screen saver, switching a power-consuming component to a low power standby mode, or switching off the apparatus or component or process. Other operational state changes may be activation of security mechanisms other than screen savers, such as password protection of a mobile telephone.

Figure 1:
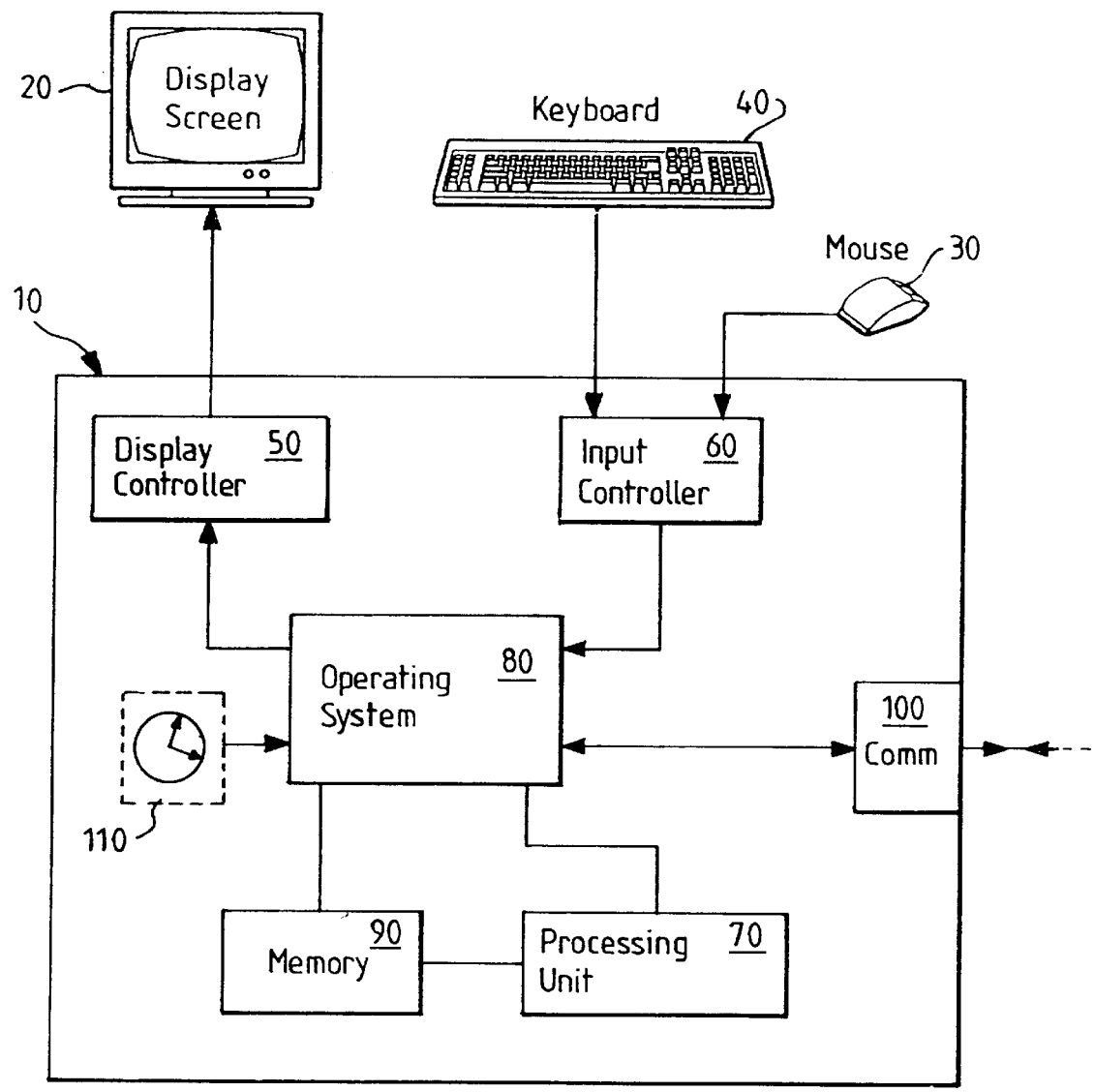
FIG. 1 is a schematic representation of components of apparatus in which the invention may be implemented.

A first embodiment of the invention will be described in detail in relation to assisting adjustment of the time period of inactivity required to activate a user-inactivity-dependent operational state change of a data processing apparatus such as a conventional personal computer. Such a data processing apparatus 10 is shown in FIG. 1 and includes a display device 20, a mouse 30, a keyboard 40, device drivers 50,60 for controlling the input and output devices, one or more processing units 70, an operating system 80, memory 90 including disk storage, and communications components 100.

User interactions with the input devices 30,40 generate signals which are sent to the mouse or keyboard device drivers 60. The user interactions are monitored by the operating system 80 which receives signals from the input device drivers 60 and which manages the actions performed in response to the user's interactions including management of operational state changes. The operating system sends instructions to the display device driver 50 to trigger operational state changes of the display device 20 such as switch to low power standby mode. The operating system also triggers the start of a program which runs a screen saver animation sequence following expiry of the screen saver inactivity period.

The operating system 80 monitors user interactions and controls a timer 110 which is used to measure the time of each user interaction. In particular the operating system measures the time between user interactions by comparing the times of the last two user interactions, and triggers operational state changes when preset time periods elapse without detection of any user interaction.

For a first example, let us assume that a data processing apparatus includes a display screen and a hard disk drive which each require significant power to operate. For this example, let us assume that the following six operational state changes may occur in response to preset inactivity periods elapsing without detection of any user interaction:

1. displaying a screen saver,
2. applying password protection to the screen saver,
3. switching the display screen to low power standby mode,
4. switching off the display screen,
5. switching the apparatus hard disk drive to low power mode (stopping disk revolution), and
6. switching off the hard disk drive.

For other apparatus, a different set of operational state changes may occur in response to user inactivity and there may be only one or a large number of different types of state change.

Each of these operational state transitions is triggered by the operating system in response to determining that the relevant inactivity period has expired without user interaction with the relevant component of the apparatus. Control mechanisms are available which enable a user to change the currently set inactivity periods, within constraints which are defined by the operating system or by a system administrator implementing policies of the organisation which owns the apparatus. In an operating system which uses windows, the user typically opens the relevant control window for changing settings—this may include a first window for setting the inactivity periods before the screen saver cuts in, before password protection cuts in, before the display device switches to low power mode, and before the display device switches off. It may not be possible to set all inactivity periods for all possible operational state transitions in a single window—for example, there may be a second window for setting the inactivity periods before the disk drive switches to low power mode or switches off.

Figure 2:
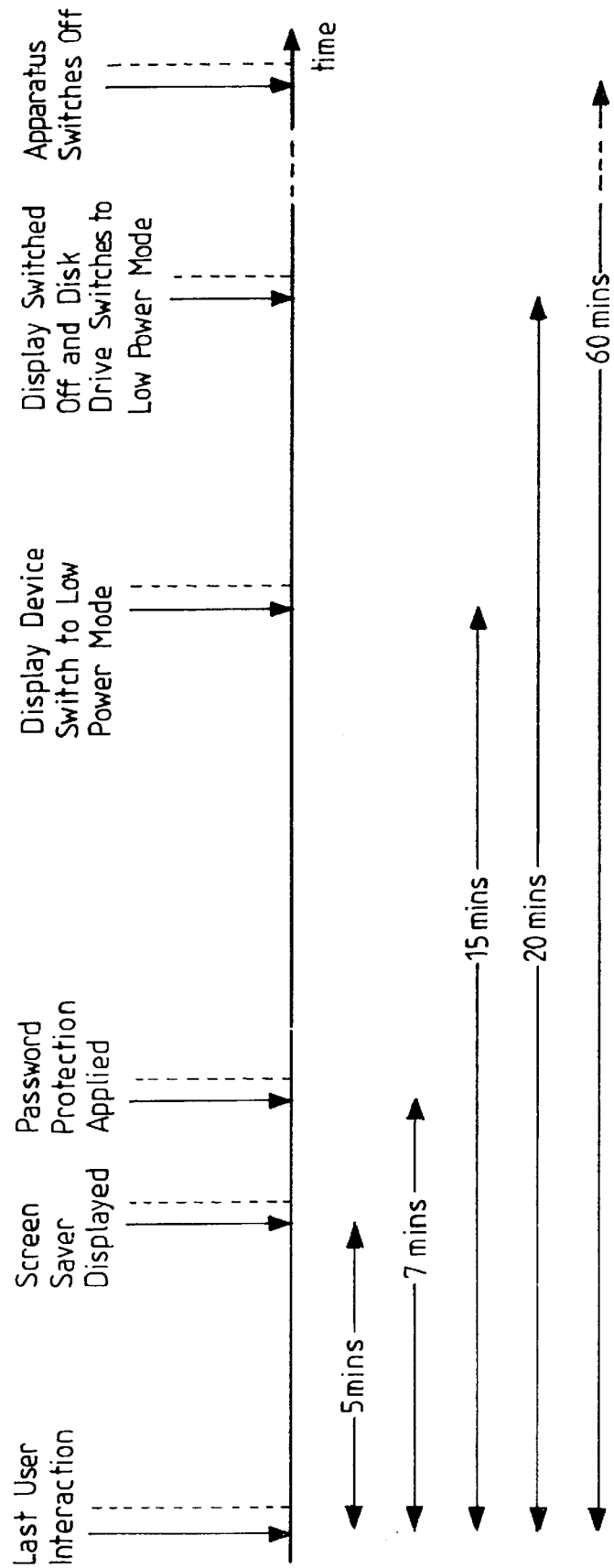
FIG. 2 is a representation of a time line showing a plurality of operational state changes of an apparatus in which the present invention is implemented.

Each of the aforementioned six transitions is represented on a time line in FIG. 2. The user may be given considerable freedom in setting the inactivity periods and so the particular example times shown are exemplary only. The user is likely to choose inactivity periods with some consideration of the inconvenience to them if the operational state changes at an inappropriate time. The factors affecting the level of inconvenience include the user effort required and the time taken to undo the state change. For a screen saver which is not password protected, moving the mouse may be sufficient to immediately remove the screen saver (i.e. in a small fraction of a second) and so a relatively short inactivity period is acceptable to typical users, whereas switching the display device from low power mode to normal mode may require a 1 second power up time before desired information is displayed and this is sufficiently irritating for a typical user to want to set an inactivity period such that the switch to low power mode is rare.

Additionally, operating system or system administrator imposed constraints may apply. For example, the inactivity period for switching the display device to low power mode and switching off the display device would typically be constrained to be at least as long as the inactivity period before the screen saver is displayed, and the inactivity period before the switch to low power mode would typically have a fixed maximum measured in minutes or a few hours.

Referring to FIG. 2, example inactivity periods set for the data processing apparatus could be as follows: after 5 minutes of inactivity, the screen saver is displayed; after 7 minutes, the screen saver becomes password protected; after 15 minutes, the display device is switched to low power mode; after 20 minutes, the display device switches off and the disk drive switches to low power mode; after 60 minutes, the disk drive switches off.

Also indicated schematically by dotted lines on the time line of FIG. 2 are short periods of time following each operational state transition. The significance of this additional time period following a state transition will now be explained.

Each of the previously described inactivity periods are used to control when the user's inactivity should be interpreted as user absence or lack of use of the apparatus such that the potentially undesirable consequences of a state transition are justified. Since a lack of detected user activity is not a reliable indicator of absence or lack of any use of the apparatus, the state transitions may occur at times which are inconvenient or at least not desired by the user.

The invention is able to improve the user's efficiency and reduce stress and irritation by recognising when input from the user subsequent to a state transition suggests that the state transition has occurred at inconvenient times, and then modifying inactivity period settings or prompting the user to change inactivity period settings.

This is made possible by monitoring user interactions following a user-inactivity-dependent operational state transition. If the user repeatedly interacts with an input device of the apparatus within a short period following a particular type of state transition, then this is interpreted as an indication that the user does not want the state transition to occur at that time and either the inactivity period is automatically changed or the user is prompted to specify a desired inactivity period for that operational state transition which will be applied thereafter.

Figure 3:
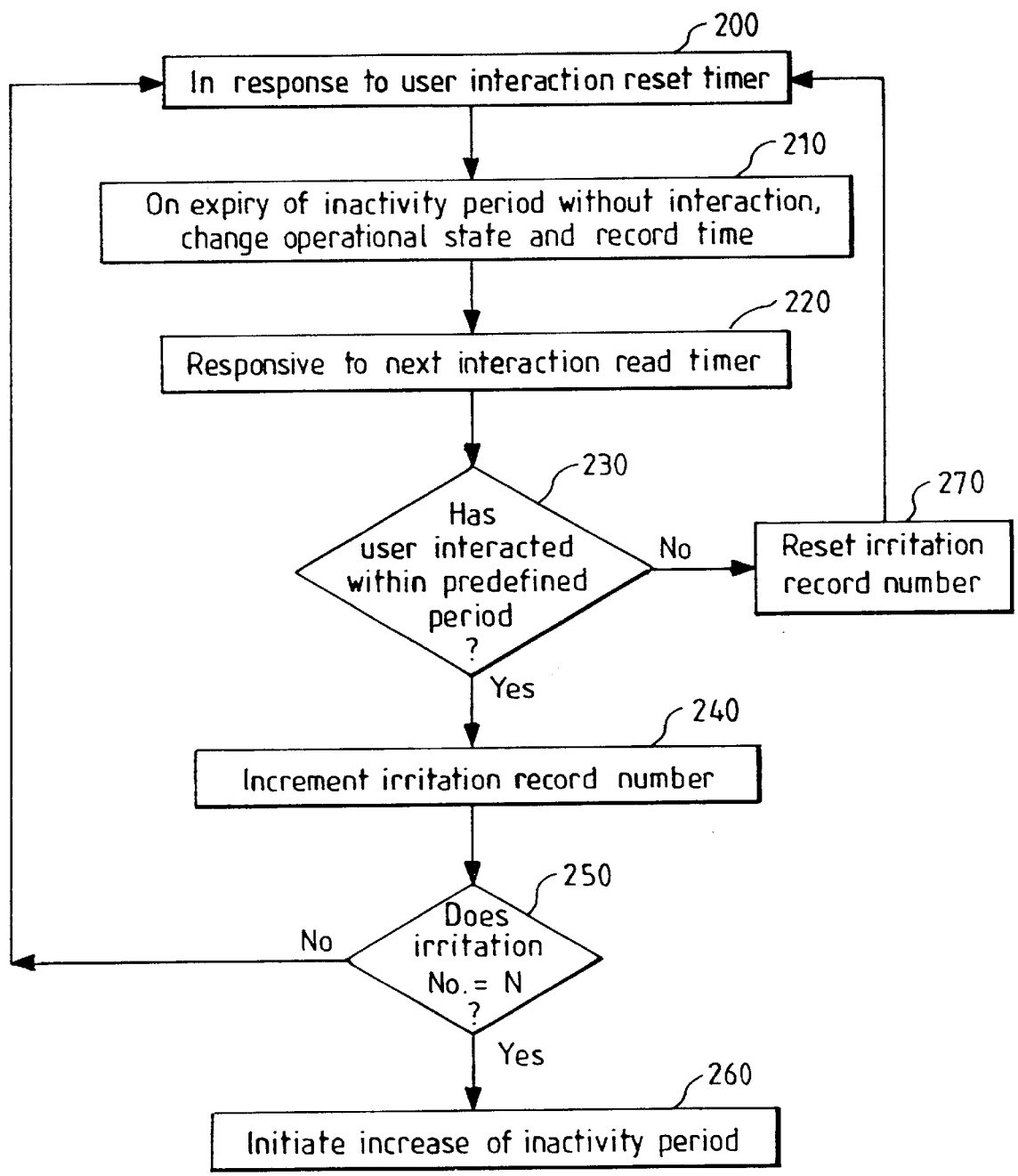
FIG. 3 is a representation of a sequence of operations performed according to an embodiment of the invention.

An example implementation of this adjustment of inactivity periods in response to user interactions following a state transition will now be described in more detail with reference to FIG. 3. Firstly, in response to each user interaction, the operating system controlled timer 110 is reset 200. If a preset inactivity period expires without any additional user interaction, then the operating system initiates 210 the relevant user-inactivity-dependent change of operational state. A record is kept of the time of each user-inactivity-triggered operational state transition, by reading the timer 110 and saving the time within an appropriate area of memory 90 (for example, in the Windows registry in the Windows 98 operating system).

When the user next interacts with an input device of the apparatus, the time of the interaction is read 220 and compared 230 with the transition time stored in memory.

If the time difference between the state transition and the next user interaction is less than 5 seconds (or some other period which is appropriate for the state transition), this is recorded by incrementing 240 a number in memory (e.g. in the Windows registry). This incremented number is a record of user interactions which, since they follow so soon after a state transition which followed a period of inactivity, are interpreted as indications that the user did not want the state transition to occur. The incremented number can be thought of as a record of user irritation with the state transitions. A separate record in the form of an incremented number is maintained for each different type of user-inactivity-dependent operational state transition.

Each time one of the state transitions causes an "irritation record" number to be incremented, the number is checked 250 to determine whether it has reached a threshold value N, for example N=3. Each time a state transition occurs and there is no user interaction within the defined period subsequent to the state transition, the relevant "irritation record" number is reset 270 to zero.

Thus, when the "irritation record" number reaches the threshold value N, this is interpreted as meaning that the user has indicated that the relevant state transition was not wanted for N consecutive occurrences of that particular type of state transition. On determining that the threshold N has been reached, the operating system is triggered 260 to prompt the user to reset the inactivity period for at least the relevant type of state transition. In a preferred embodiment, the operating system is triggered to display the standard inactivity period settings window relevant to that state transition.

Note that the short period following a state transition for which user interactions are interpreted as indications of user irritation may be a fixed period of time or it may also be modifiable by users. The period may be different for each type of inactivity-dependent state transition or it may be the same for different types of state transition.

The above reference to the operating system being triggered to display a settings window does not imply that the settings window must be displayed immediately in response to the threshold number being reached. Since the "irritation record" number can be interpreted as an indication that the user is busy on a task and does not want to be diverted from that task, it may be considered inappropriate in some embodiments of the invention to display the settings control window at that time. Therefore, display of the settings control window is preferably delayed until a later time when the user's task is deemed to be complete. In a preferred embodiment, the settings control window is only displayed when the user requests either log off or shut down.

The usual option within settings control windows for the user to simply accept the current settings prevents the appearance of the settings control window at log off or shut down being a cause of significant additional irritation. In one embodiment, a dialog box may first be displayed which gives the user options to either "adjust screen saver or power settings" or to "keep current screen saver and power settings".

In an alternative embodiment, the adjustment of the inactivity period settings is performed automatically in response to the threshold value of the "irritation record" number being reached. For this implementation, the size of the adjustment to be implemented must be predefined—for example, as a specific time period such as 1 or 5 minutes or as a proportion of the current inactivity period. In this example, the user does not need to be involved in the adjustment of the inactivity period settings and does not even need to know that they have been changed—the operating system automatically adjusts the behaviour of the apparatus in response to the operating system's interpretation of user indications of desired behavioural changes.

As noted previously, the invention is also useful for reducing inactivity periods where it is determined that the current settings do not represent an optimal use of the apparatus and it is determined that reduction should not significantly increase user irritation or compromise user efficiency. Reduction of the inactivity period before a state transition may be required to conform to a company's energy conservation or security policy, or to maximize the time that a desired advertising demonstration is displayed on the screen. This has to be balanced with the need to avoid unnecessary irritation for users resulting from unwanted state transitions. An example of use of the invention to reduce an inactivity period will now be described.

The time at which a user logs on to the apparatus is recorded. The mechanism described above is used for determining whether a user has interacted with an input device within a predefined short period following a state transition. A record is also kept of at least the first occurrence of each different type of state transition (i.e. a flag may be set indicating whether a transition of each type occurred, or a record of the number of state transitions of each type could be recorded). If the user interacts with the apparatus within this short period, the irritation record number for that type of state change is incremented by one.

It may be unnecessary to reset the irritation record number in cases where there is no user interaction within the short period, if a single instance (or a threshold number M>1) of user interaction within the predefined period following a state transition is sufficient to determine whether a change of inactivity period is required (i.e. for some embodiments of the invention, consistent user interaction in response to consecutive occurrences of a state transition is not a requirement for determining whether an inactivity period should be changed).

When the user logs off, a comparison is made between log on and log off times. If this is less than a predefined period (for example 4 hours) then no action is taken—the period of use is considered to be insufficient to determine usage characteristics which accurately represent typical use. However, if the period is more than 4 hours, and there is a record of at least one occurrence of a particular type of state transition, then the irritation record number for that type of state transition is checked when the user logs off. If the irritation record number is non-zero (or satisfies some other threshold M), then the user is interpreted as having indicated irritation when at least one state transition of this type occurred and the inactivity period for that type of state transition is not reduced (the inactivity period may be increased as described above).

If the irritation record number for a particular type of state transition is zero, and such a state transition has occurred, this is interpreted as an indication that the user was not irritated by any of the state transitions of this type which occurred during the period. This is then interpreted as an indication that the current inactivity period settings may be longer than is necessary in order to avoid user irritation. In this circumstance, if the inactivity period for a particular type of state transition is longer than a defined optimum setting, the inactivity period is reduced in a predefined way (e.g. reduced by 1 minute).

The above examples of increase and of automated reduction of inactivity periods are for illustration only, and it will be clear to a person having ordinary skill in the art that many different embodiments are possible within the scope of the invention. In particular, it should be noted that many different policies may be implemented for determining when the timing of a user-inactivity-dependent change of operational state of an apparatus seems to require adjustment, and different mechanisms are possible for achieving that adjustment. An important factor when implementing the invention is the desire to provide ease of use.

It will also be clear to persons skilled in the art the invention may be implemented to assist both the increasing and decreasing of inactivity periods for a particular apparatus as appropriate, such that a balance may be achieved automatically between avoidance of user irritation and adjustment towards system-defined or administrator-defined optimum settings. This automatic balancing of potentially conflicting requirements has applicability for an apparatus which is used by multiple users and in which the preferred inactivity period settings are stored with other apparatus settings in association with a user identifier (e.g. user ID and password). Typical users do not want to have to manually change settings each time they use an apparatus.

The above described steps of methods implementing the invention can be summarised as follows. A first method for assisting a user of an apparatus with modification of the timing of a user-inactivity-dependent change of operational state of the apparatus includes the following steps:

1. monitoring user interactions with the apparatus and determining when a predefined inactivity period has expired without user interaction;
2. changing the operational state when the inactivity period has expired without user interaction during that period (these steps are known in the art for activating display of a screen saver or switch of a display monitor to low power standby mode);
3. determining whether the user interacts with the apparatus within a predefined time period following the change of operational state; and
4. in response to positive determination of user interaction with the apparatus within the predefined time period following the change of operational state, initiating an increase of the inactivity period; or, in response to a negative determination, initiating a decrease of the inactivity period. The modification of the inactivity period may be initiated only when certain conditions are met, such as when the determination of user interactions is positive following N consecutive occurrences of a state transition, or when the determination is negative for every occurrence of a state transition of a particular type within a defined period of time.

Another useful implementation of the invention in relation to password-protected screen savers is to display a screen saver and then to wait for a short period of time before applying password protection. Password protection is applied if the user does not interact with an input device within a predefined period (for example 5 seconds) of display of the screen saver, but no password entry is required if the user interaction is within the predefined period. This provides the advantages of avoiding the irritation of having to enter a password if the user responds quickly to display of the screen saver (by moving a mouse or pressing a key or other input), while giving the security benefit of password protection almost as soon as expiry of the inactivity period suggests that the user is absent. The invention allows the inactivity period to be adjusted in response to interactions within the predefined period of time following display of the screen server. The invention also allows adjustment of the duration of the period of time following display of the screen saver before password protection is applied, based on whether the user interacts with the apparatus in an additional period of time following application of password protection.

The invention may be implemented to retain information relating to the user's interaction patterns over an extended period of time so that the apparatus inactivity period settings become optimised for that user over time. Once optimised, the system learning and inactivity period optimisation features could be switched off or optimisation could continue as a background process.

Alternatively, the automatic settings adjustment implemented by the invention could be specific to the current session, such that the apparatus responds to the user interactions while performing a particular set of tasks but then reverts to the default sessions for future user sessions when the tasks may differ.

A further example application of the present invention is in the context of a data processing apparatus including a first device with which the user interacts and which communicates with a remote data processing system. It is common for a computer system to log users off if they appear to be inactive for a predefined period of time. The user may be performing other tasks on a local workstation or PDA which involve interaction with that local device, but if they do not communicate with the remote computer system within the defined inactivity period then the remote system logs them off. This can be irritating, especially if the user only stopped interacting with the remote computer system for a period of time while performing a task which is related to a process running on the remote computer system and then returned to the process on the remote computer system. Using the present invention, the remote system may identify when a user logs back on to the remote system within a predefined period following automatic log off and interpret this as an indication that the user did not want to be logged off. Thereafter, or following repeated logons within the predefined period, the inactivity period applied to that user by the remote system is increased.

Alternatively, a process on the remote computer system could send a query to the local device following expiry of an inactivity period. This query could either:

1. trigger a check of the local device's record of user interactions—If the reply sent to the remote system indicates that the user has recently interacted with the local device then the remote system waits for a defined inactivity period before logging the user off, but if there has been no user interaction within a set period then the remote system deems the user to be absent and logs them off—or
2. cause the local device to display to the user the question "Do you still require process X? Yes__No__". If the user does not reply Yes within a predefined period, they are logged off.

While particular example preferred embodiments have been described above in the context of a data processing apparatus such as a conventional computer, the invention is equally applicable to any user-inactivity-dependent change of operational state of an apparatus where the state transition could be an inconvenience to the user.

For example, a voice-activatable security mechanism for a mobile telephone may be automatically activated if no user interaction with the telephone is detected within a 5 minute inactivity period. After activation of the security mechanism, the user has to speak a password to be able to use the telephone. If the user consistently uses the telephone within 5 minutes of activation of the security mechanism, then the inactivity period may be changed to 10 minutes.

What is claimed is:

1. A method for assisting a user of an apparatus with modification of the timing of a user-inactivity-dependent change of operational state of the apparatus, the method including:

monitoring user interactions with the apparatus and determining when a predefined inactivity period has expired without user interaction;

changing the operational state when the inactivity period has expired without user interaction during that period;

determining whether the user interacts with the apparatus within a predefined time period following the change of operational state;

in response to the determination of whether the user interacts with the apparatus within the predefined time period following the change of operational state, initiating a modification of the inactivity period.

2. A method according to claim 1, wherein the apparatus includes a display device and the change of operational state is display of a screen saver via the display device.

3. A method according to claim 1, wherein the change of operational state is switching to a low power standby mode.

4. A method according to claim 1, wherein the change of operational state is switching off one or more components of the apparatus.

5. A method according to claim 1, wherein the change of operational state is logging off a user or warning a user of imminent log off.

6. A method according to claim 1, wherein the apparatus is a data processing apparatus including an operating system software component which implements functions to perform the steps of:

determining when a predefined inactivity period has expired without user interaction;

initiating the change of operational state when the inactivity period has expired without user interaction during that period;

determining whether the user interacts with the apparatus within a predefined time period following the change of operational state; and in response to the determination of whether the user interacts with the apparatus within the predefined time period following the change of operational state, initiating a modification of the inactivity period.

7. A method according to claim 1, wherein the modification of the inactivity period is initiated in response to a determination of a lack of user interaction within the predefined time period.

8. A method according to claim 7, wherein the modification of the inactivity period is only initiated upon indication of completion of the current user task and only if the determination is negative for all occurrences of the change of operational state during the current user task.

9. A method according to claim 1, wherein initiating modification comprises initiating display of a user interface component from which the user can specify a modified inactivity period.

10. A method according to claim 9, wherein the user interface component is displayed upon indication of completion of a current task.

11. A method according to claim 1, wherein initiating modification comprises automatically modifying the inactivity period.

12. A method according to claim 11, wherein the inactivity period is increased when the user interacts with the apparatus within the predefined time period following the change of operational state.

13. A method according to claim 1, wherein the change of operational state is activation of a security mechanism.

14. A method according to claim 13, wherein the security mechanism includes password protection.

15. A method according to claim 1, wherein the modification of the inactivity period is initiated in response to a positive determination of user interaction within the predefined time period.

16. A method according to claim 15, wherein the modification of the inactivity period is only initiated if the user interacts with the apparatus within the predefined time period following the change of operational state for each of N consecutive occurrences of the change of operational state, where N>1.

17. A method according to claim 15, wherein the modification of the inactivity period is only initiated if the user interacts with the apparatus within the predefined time period following the change of operational state for at least M occurrences of the change of operational state within a single continuous period of time in which the apparatus remains switched on, where M>1.

18. A component for an apparatus in which one or more operational state changes occur in response to expiry of respective predefined periods of user-inactivity, for assisting a user of the apparatus with modification of the timing of a user-inactivity-dependent change of operational state of the apparatus, the component including:

means for monitoring user interactions with the apparatus and determining when a predefined inactivity period has expired without user interaction;

means for initiating a change of operational state when an inactivity period expires without user interaction during that period;

means for determining whether the user interacts with the apparatus within a predefined time period following the change of operational state;

means, responsive to the determination of whether the user interacts with the apparatus within the predefined time period following the change of operational state, for initiating a modification of the inactivity period.

19. An operating system software component for running on a data processing apparatus in which one or more operational state changes occur in response to expiry of respective predefined periods of user-inactivity, the operating system implementing functions for controlling the operation of the data processing apparatus to perform the steps of:

monitoring user interactions with the apparatus and determining when a predefined inactivity period has expired without user interaction;

initiating the change of operational state when the inactivity period has expired without user interaction during that period;

determining whether the user interacts with the apparatus within a predefined time period following the change of operational state; and in response to the determination of whether the user interacts with the apparatus within the predefined time period following the change of operational state, initiating a modification of the inactivity period.

\* \* \* \* \*